(12) United States Patent
Grumbine

(10) Patent No.: US 6,751,344 B1
(45) Date of Patent: Jun. 15, 2004

(54) ENHANCED PROJECTOR SYSTEM FOR MACHINE VISION

(75) Inventor: Michael T. Grumbine, Whittier, CA (US)

(73) Assignee: Champion Orthotic Investments, Inc., West Covina, CA (US)

( * ) Notice: Subject to any disclaimer, the term of this patent is extended or adjusted under 35 U.S.C. 154(b) by 0 days.

(21) Appl. No.: 09/578,233

(22) Filed: May 24, 2000

Related U.S. Application Data

(60) Provisional application No. 60/136,883, filed on May 28, 1999.

(51) Int. Cl.$^7$ .................................................. G06K 9/00
(52) U.S. Cl. ........................ 382/154; 382/128; 382/199; 382/288; 382/274; 382/285
(58) Field of Search ................................ 382/154, 100, 382/141, 152, 285, 128, 199, 274, 288; 356/12, 602, 603, 604, 611; 348/42, 44, 46; 250/559.23

(56) References Cited

U.S. PATENT DOCUMENTS

| | | | |
|---|---|---|---|
| 5,867,250 A | * | 2/1999 | Baron .......................... 351/212 |
| 6,028,672 A | * | 2/2000 | Geng .......................... 356/602 |
| 6,064,756 A | * | 5/2000 | Beaty et al. ................ 382/146 |
| 6,144,366 A | * | 11/2000 | Numazaki et al. .......... 345/156 |
| 6,229,913 B1 | * | 5/2001 | Nayar et al. ................ 382/154 |
| 6,377,700 B1 | * | 4/2002 | Mack et al. ................ 382/154 |
| 6,463,351 B1 | * | 10/2002 | Clynch ........................ 700/163 |

* cited by examiner

*Primary Examiner*—Timothy M. Johnson
*Assistant Examiner*—Ali Bayat
(74) *Attorney, Agent, or Firm*—Larry K. Roberts

(57) ABSTRACT

A method for optically scanning a subject having a three-dimensional surface contour includes illuminating the subject with a matrix of discrete two-dimensional image objects such as a grid of dots. Respective object illumination images of the illuminated subject are captured from different known image perspectives. The respective object illumination images are processed to obtain a set of three-dimensional coordinates of at least a portion of the surface contour, including correlating positions of common discrete image objects in the respective illumination images, using data regarding the image perspectives. The machine vision system includes camera apparatus disposed at different camera perspectives relative to a subject, and one or more light projectors for projecting a grid-like structured light projection onto the subject. The machine vision system captures a sequence of images including a light object projector image and an ambient light reference image from each camera perspective. A processor determines and correlates the image light objects to generate a set of common surface reference points between camera perspectives, and then triangulates upon the reference points to produce a three-dimensional set of coordinates for at least a portion of the surface of the subject.

29 Claims, 14 Drawing Sheets

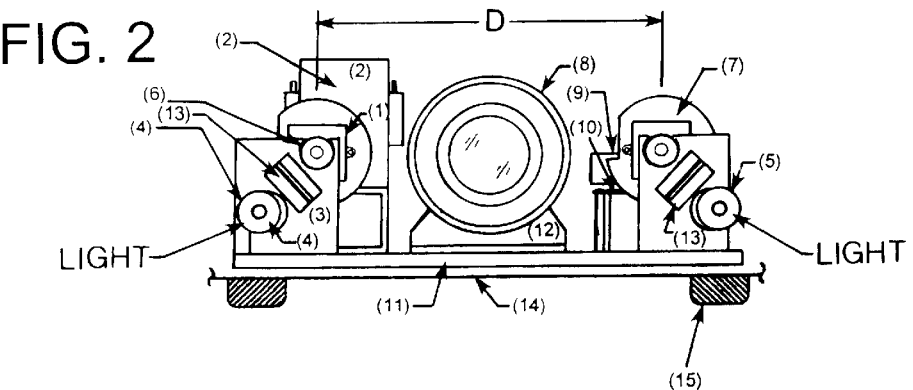
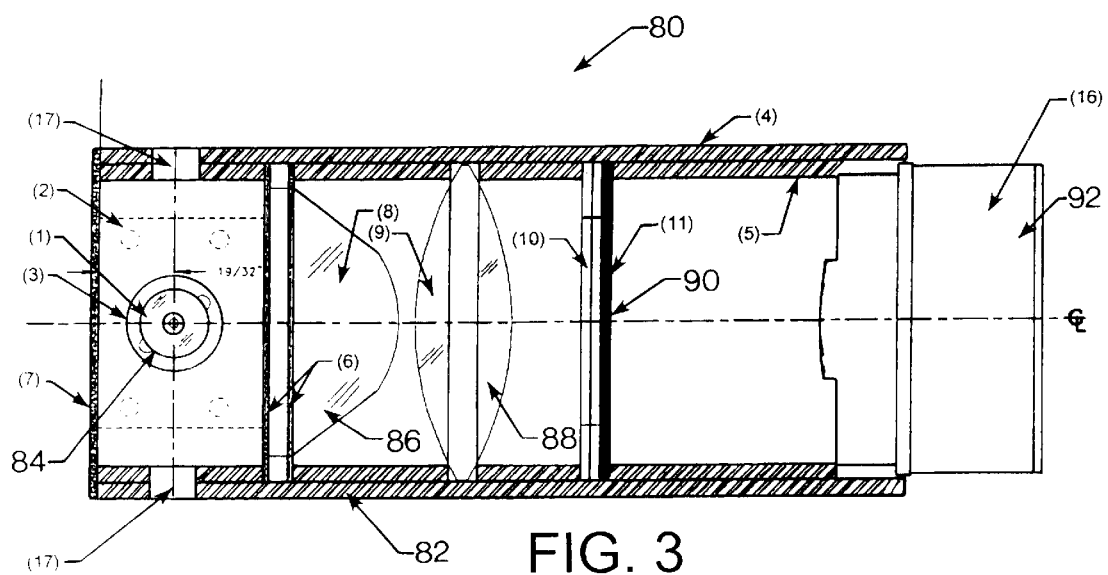
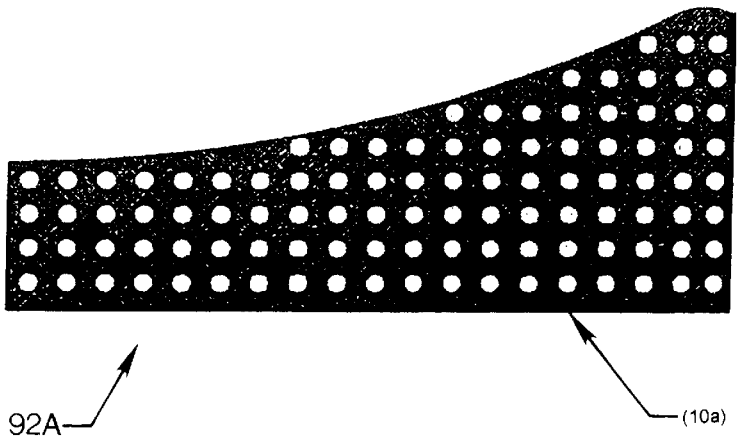

ENHANCED PROJECTOR SYSTEM FOR MACHINE VISION

CROSS-REFERENCE TO RELATED APPLICATION

This application claims the benefit of U.S. Provisional Application No. 60/136,883, filed May 28, 1999, the entire contents of which are incorporated herein by this reference.

TECHNICAL FIELD OF THE INVENTION

This invention relates to optically based machine vision techniques, and more particularly to techniques for determining the three-dimensional coordinate geometry of certain types of scanned surfaces where the subject is largely comprised of more gently changing surfaces, such as animal and human surface anatomy.

BACKGROUND OF THE INVENTION

Optically based machine vision systems, when used for the purpose of mapping the geometry of a surface, typically use one or more of either electronic cameras or input perspectives (using mirrors) in order to create a difference in viewing angle for the scanned subject. In order to generate these multiple perspectives, structured light beams typically in the shape of a line, would be moved over the surface with a series of images being simultaneously captured by the machine vision system's cameras. These multiple perspectives allow the various optical machine vision systems to first correlate common points of reference on the scanned subject's contours, and then to utilize algorithms which triangulate on these points so as to eventually transform them into three-dimensional coordinate measurements.

Thus what begins as a two-dimensional graphics image comprised of camera-image pixels (as originally scanned or captured through the machine vision cameras) is transformed into a three-dimensional surface definition of the subject's geometry, or contour map. Accomplishing the creation of this resultant database of surface coordinates allows the surface to be utilized in a wide variety of purposes and manners, not least of which would include Computer Aided Design and Computer Aided Manufacture (CAD/CAM) processes and products. The accuracy and resolution by which the coordinate database describes the original surface of the subject scanned is related in part to both the density with which these common points are selected and measured upon the surface of the subject, as well as the extent to which the entire surface of the subject has its contour mapped with these points of measurement. Generally speaking, the more of these common points which are identified and measured over the greatest extent of the surface possible, the more completely, accurately and precisely the surface contours of the original subject are defined.

Depending upon the particular types of application, varying amounts of the original subject's surface need to be scanned so that they might be reduced to the desired coordinate geometry definition. As an example, it is desirable when foot anatomy is scanned for the purpose of producing a foot orthosis, that the side dimensions of the foot (including the side of the medial arch, the lateral side, and the back of the heel areas) should be measured, along with the contours of the underside of the foot; however the top of the foot is irrelevant. Since at least two input perspectives must normally be acquired in order to triangulate on any one point of the surface's contours (and thereby derive a three-dimensional coordinate measurement for that point), this has typically been achieved by adding more expensive equipment, including greater numbers of viewing components such as cameras or mirrors, more light sources, lenses and other optical components, machine extensions, larger enclosures and moving or motorized parts, etc. Additionally, more camera images are typically taken, with the overall effect of the foregoing problems typically resulting in a bulkier, more costly, and usually slower operating machine. This slowness in executing a scan was generally required by the design approach of using moving parts or extensive sequences of camera images.

SUMMARY OF THE INVENTION

In accordance with an aspect of the invention, a method is described for optically scanning a subject having a three-dimensional surface contour, comprising:

illuminating the subject with a matrix of discrete two-dimensional image objects;

capturing respective object illumination images of the illuminated subject from different known image perspectives; and processing the respective object illumination images to obtain a set of three-dimensional coordinates of at least a portion of the surface contour, said processing including correlating positions of common discrete image objects in the respective illumination images, using data regarding the image perspectives.

In accordance with another aspect of the invention, a machine vision system is disclosed, and includes camera apparatus disposed at different camera perspectives relative to a subject, and one or more light projectors for projecting a grid-like structured light projection onto the subject. The machine vision system captures a sequence of images including a light object projector image and an ambient light reference image from each camera perspective. A processor determines and correlates the image light objects to generate a set of common surface reference points between camera perspectives, and then triangulates upon the reference points to produce a three-dimensional set of coordinates for at least a portion of the surface of the subject.

BRIEF DESCRIPTION OF THE DRAWING

These and other features and advantages of the present invention will become more apparent from the following detailed description of an exemplary embodiment thereof, as illustrated in the accompanying drawings, in which:

FIG. 2 is a front view of the machine vision system of FIG. 1.

FIG. 3 is a side cross-sectional view of the pattern or object projector of the system of FIG. 1.

FIG. 4 is a partially broken-away view of the pattern or object mask for the projector of FIG. 3.

DETAILED DESCRIPTION OF THE PREFERRED EMBODIMENTS

Overview

In accordance with an aspect of the invention, an enhanced projector system is combined with a multi-camera/perspective machine vision system, to allow mapping of the surface geometry of a target subject. One method of using the system employs a grid-style structured light projection onto the subject, with subsequent image and data processing to establish points of reference data including the common points of structured light which are shared by the various cameras focused on the scanned subject's contours. This allows a three-dimensional database to be generated.

Another technique is to use the same structured projection light and resultant data in conjunction with non-structured light which establishes perimeter data for the subject, and correlating these two types of data (whether derived from one image or many) so as to produce pseudo-three-dimensional coordinates for surface areas that actually have only one input perspective, rather than two. This enlarges the total area of the subject scanned for which the enhanced projector system is able to map the surface contour of the subject. This is especially relevant for those areas where the subject's contours wrap up and away from one of the camera's perspective.

The invention is described in the context of an exemplary application of a foot scanner which incorporates a stereo machine vision system in conjunction with a three projector Enhanced Projector System (FIGS. 1–5). It utilizes multiple images acquired by a succession of camera "snapshots" or video images where each of the three projectors are turned on separately and the image is then acquired, as well as a "dark reference" image (where no projector is on and only ambient room lighting is illuminating the subject). Each of the projector images is then subjected to image enhancement routines such as an "image subtraction" which are per se well-known in the image processing field, thereby sharpening their detail and enhancing their utility and accuracy. These images are then correlated together, compared and extrapolated from, in order to provide an enhanced contour definition.

Figure 5:
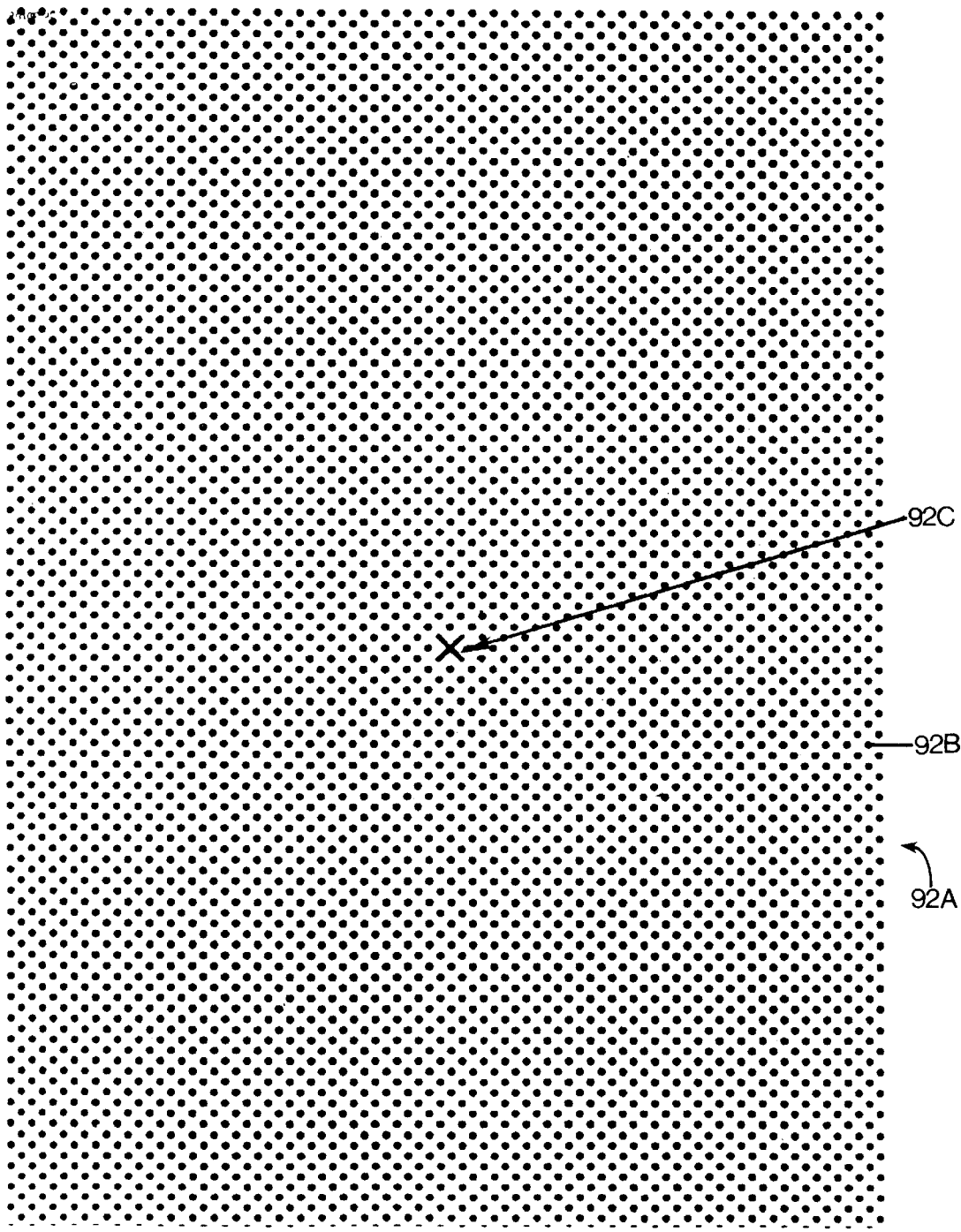
FIG. 5 illustrates the pattern projected by the projector of FIG. 3 onto a flat surface.

More specifically, the Light Object Projector emits a structured light projection, the negative of which is illustrated in FIG. 5, onto the subject's foot, producing a matrix pattern of discrete "Light Objects" on the scanned surface. In this example, most of these Light Objects are of fairly similar size, shape and spacing. However it is helpful to have one or more of the Light Objects be of a unique size and/or shape, so as to allow the software algorithms (described below) to easily identify one or more initial common Light Object from each of the different cameras or perspectives. An example of this Initial Common Light Object is identifiable in FIG. 5 as the large "X" shaped Light Object 92B.

This allows the information from the machine vision system to be processed with an identifiable reference point for the scanned subject's surface geometry, thereby ordering all other Light Objects in the image's two-dimensional matrix of the Light Objects to be referenced to this Initial Common Light Object. This then allows for the standard methods in the art for triangulating upon a given point from the images of these perspectives, thereby deriving both individual three-dimensional coordinates for these reference points, as well as a complete database of such points which thus map a useful contour of the scanned subject.

For some applications, it can be useful to employ more than one Initial Common Light Object, e.g. for highly irregular surfaces, or for scanning non-contiguous surfaces, say when both feet are scanned at once. Also, using more than one origin marker can add to the reliability of the scanning.

The projection's focal length, depth of focus, density of Light Objects, and overall size will vary from application to application, as dictated by the needs of the application and the shape and size of the subject. Additionally, not only may the Light Objects be used to generate reference points, but also the dark grid interspersed between the Light Objects may be used in like fashion to generate additional or alternate points.

Second and third projectors emit a non-structured lighting from the most advantageous perspectives which allow the illumination of the face and the sides of the subject relative to the camera's view (typically either one projector or light or one set of projector lights per camera perspective), thereby allowing each camera to capture an image of the scanned subject with the sides illuminated. Then edge detection software algorithms known in the art are utilized to create an edge profile from these images and data captured by the machine vision system. The edge profile data are related to those of the Light Object projections, and to the contour map, so as to extrapolate pseudo three-dimensional point data along the periphery of the subject scanned. This enhances the extent of the geometry definition.

Besides the examples given below for correlating common points of reference between the various camera perspectives there are also other methods known to the art which allow the cameras to correlate commonly viewed subjects, and these also may be utilized as appropriate. The invention presents, among other things, a method to generate more extensive points of reference and a more accurate mapping of the surface contours. Further advantages of the invention include the rapidity of its scanning which greatly enhances its utility for scan subjects which have a propensity to move, such as those involved in human or animal anatomy. By way of example, one exemplary system in accordance with the invention requires only a series of three illuminations and sets of camera images to be performed, instead of the dozens typically required by prior art scanners. Further, there are no moving parts needed which require further cost as well as time for their operations in order to effectuate the various imaging sequences, as is usually the case with the aforementioned prior art scanners. Thus the current invention affords a rapidity of operation which is generally better than many of the prior art scanners, while at lower cost.

The System

FIGS. 1–4 illustrate aspects of a machine vision system 50 embodying aspects of the invention. A housing structure 52 includes a floor 52A. The housing structure supports two cameras 60, 70 mounted adjacent to sides of the structure. The cameras are spatially separated by a distance D (FIG. 2), in this embodiment of approximately 5.75 inches. The cameras are mounted as angular offsets relative to each other such that the optical axes 60A, 60B of the respective cameras intersect at an image plane 66 at which the subject 40 is to be located to provide stereo perspectives of a subject at the image plane. The image plane 66 is located at a focal distance F in front of the cameras and the projector 80. In this exemplary embodiment, the distance F is 15 inches.

It will be appreciated that instead of two cameras, a single camera could be employed with an arrangement of mirrors to provide the stereo perspectives. Moreover, more than two perspectives can be employed as well.

Figure 1:
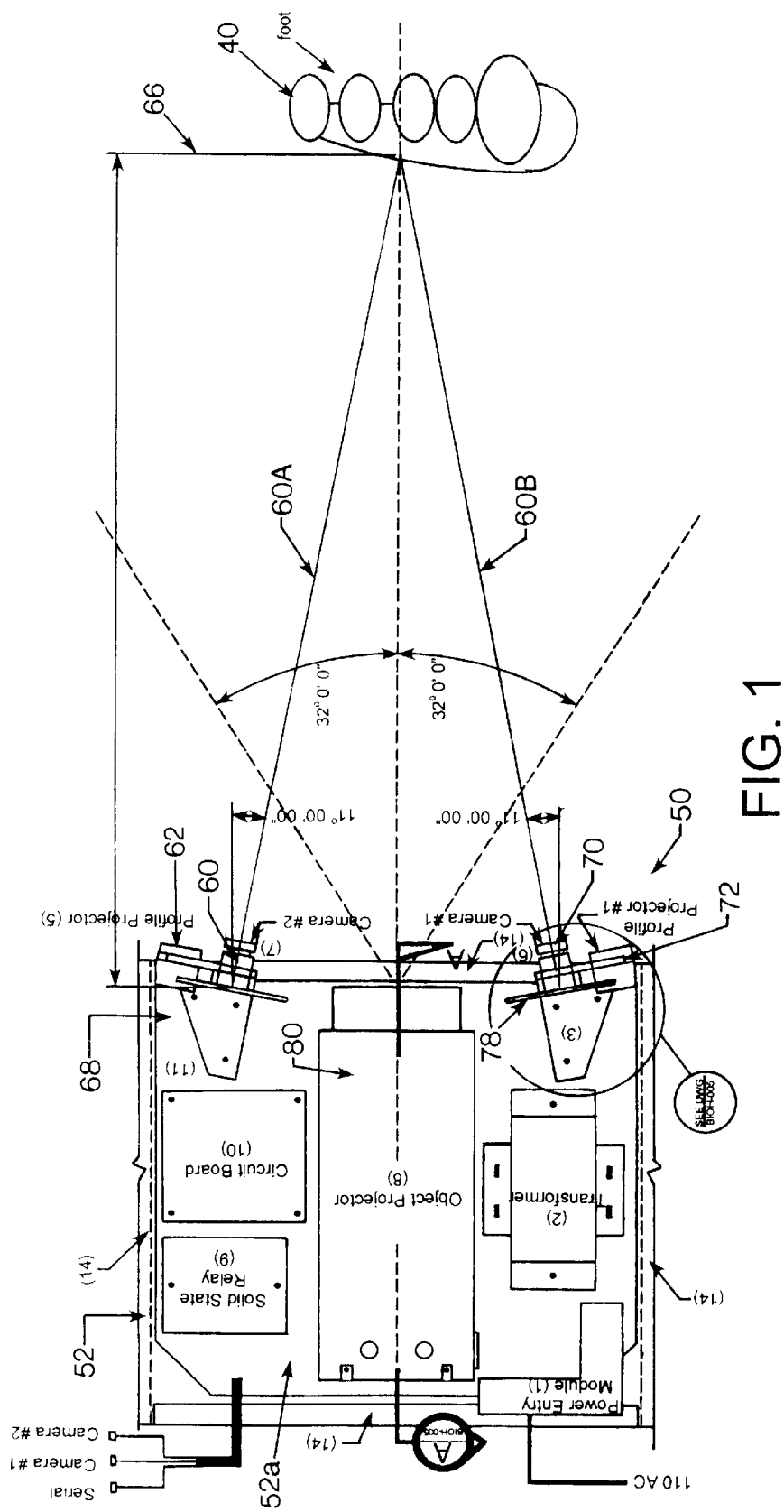
FIG. 1 is a top view of aspects of a machine vision system with an enhanced projection system in accordance with the invention.

Each camera 60, 70 has associated therewith a respective profile projector 62, 72. The projectors 62, 72 project light beams for illuminating the subject 40 from the perspective of the respective camera. Thus, each projector is located at substantially the same angular orientation of the associated camera. Respective bracket structures 68, 78 support the camera and profile projectors in this angular orientation (FIGS. 1 and 2).

The cameras employed in this exemplary embodiment are marketed by Connectix Corporation, as model QuickCam (grey scale), with 64 levels of grey and a 180 pixel by 320 pixel image size. These cameras provide digitized images of the subject, in this example a human patient's foot.

In this exemplary embodiment, the profile projectors 62, 72 include a xenon-gas-filled bulb, with an elliptical reflector. A bulb and reflector suitable for the purpose are marketed by Carleylamps, Inc., as respective lamp model 808 and reflector model 1930; this bulb outputs 23 candlepower at 9.6 V. Of course, for other applications, different profile lighting arrangements can be employed, including an array of light sources.

Disposed between the cameras 60, 70 and associated profile projectors 62, 72 is an object projector system 80, which has an optical axis 82 which nominally intersects the axes 60A, 60B on the image plane 66.

The projector system is shown in further detail in the cross-sectional view of FIG. 3. The projector includes a tubular housing structure 82 in which are mounted a projector light bulb 84, a first condenser lens 86, a second condenser lens 88, a light mask 90 and an output lens 92. In this exemplary embodiment, the bulb 84 is a 300 watt bulb generating about 6900 lumens. Lens 86 has a diameter of 56 mm and a focal length of 39 mm. Lens 88 has a diameter of 63 mm and a focal length of 75 mm. In this exemplary embodiment, lens 92 has a focal length of 28 mm, a zoom ratio of 1–5, and a 75° angle of view, an aperture ratio of F 2.8 to F 22, and can be manually focussed.

The light mask 90 is fabricated in this exemplary embodiment as a flat glass plane or slide film having the dot object pattern 92A (FIG. 4) formed thereon with high temperature opaque markings or paint, wherein openings are formed in the opaque markings to define the object pattern. The object pattern 92A includes a rectilinear opening matrix of dots 92B of approximately 0.2305 mm diameter, separated on a diagonal of approximately 0.62 mm, and a 0.44 mm row-to-row and column-to-column spacing. The pattern 92A also includes an "X" object 92C of dimension 1.45 mm in length and 0.161 mm in width (FIG. 5). FIG. 5 illustrates the pattern 92A in negative, wherein the dots 92B and X 92C are represented in black, and the background is in white. In practice, in the exemplary embodiment, the projector 80 will project the pattern with the opaque regions of the mask preventing passage of projection light on the background.

The projector 80 projects the object pattern at a focal length of 15 inches +/–3.5 inches, and has the capability of concurrently adequately focusing the pattern within 6 inches, in this exemplary embodiment. Other structures and techniques for projecting a structured object pattern can alternatively be employed.

Figure 6:
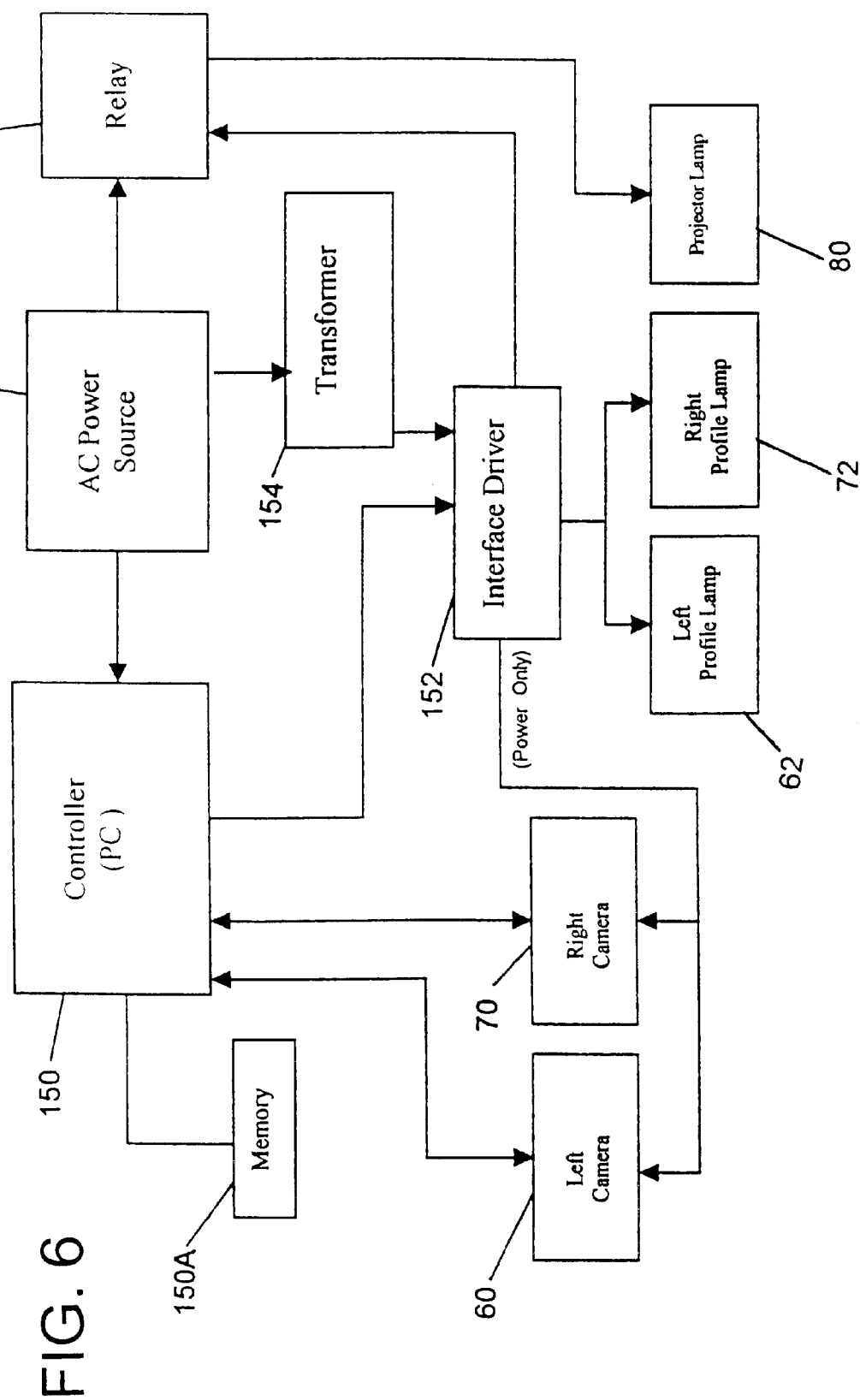
FIG. 6 is a schematic block diagram of elements of the system of FIG. 1.

FIG. 6 is a simplified schematic control block diagram for the system 50. In this exemplary embodiment, a controller 150, which can be implemented as a personal computer with memory 150A, provides the overall control of operation of the system. The cameras 60, 70 are connected to ports of the controller. An interface driver circuit 152, mounted on the housing of the system, is coupled to a port of the controller, and drives a relay 158 for the projector 80 as well as the profile projectors 62, 72. Power is provided by an AC power source 156 and DC transformer 154. This arrangement enables the controller to execute the data capturing sequences, and to process the image frames to obtain the 3D coordinate data of the subject using techniques described herein.

Figure 7:
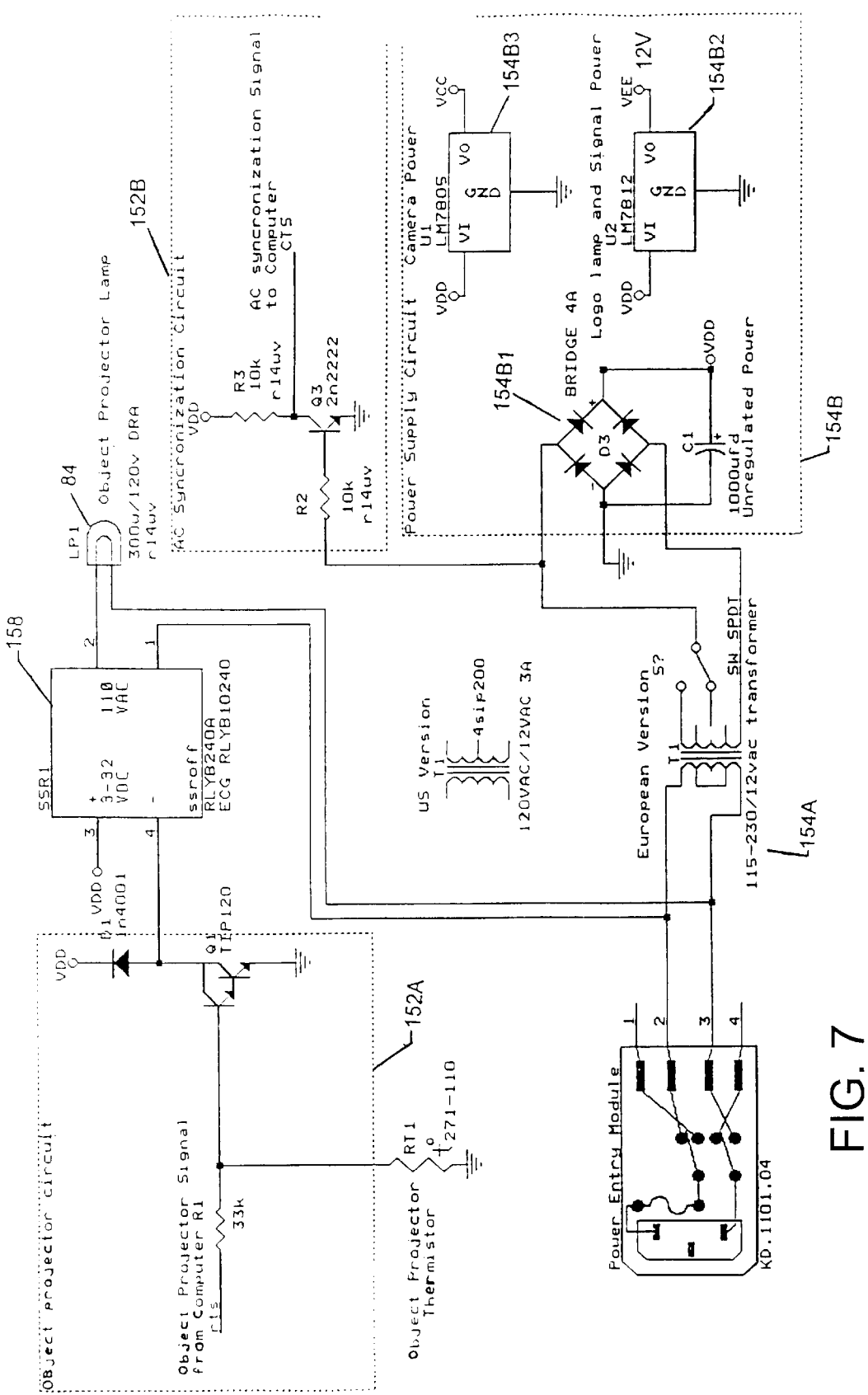
FIG. 7 is an electrical schematic diagram including a portion of the interface driver circuit shown in FIG. 6.
Figure 8:
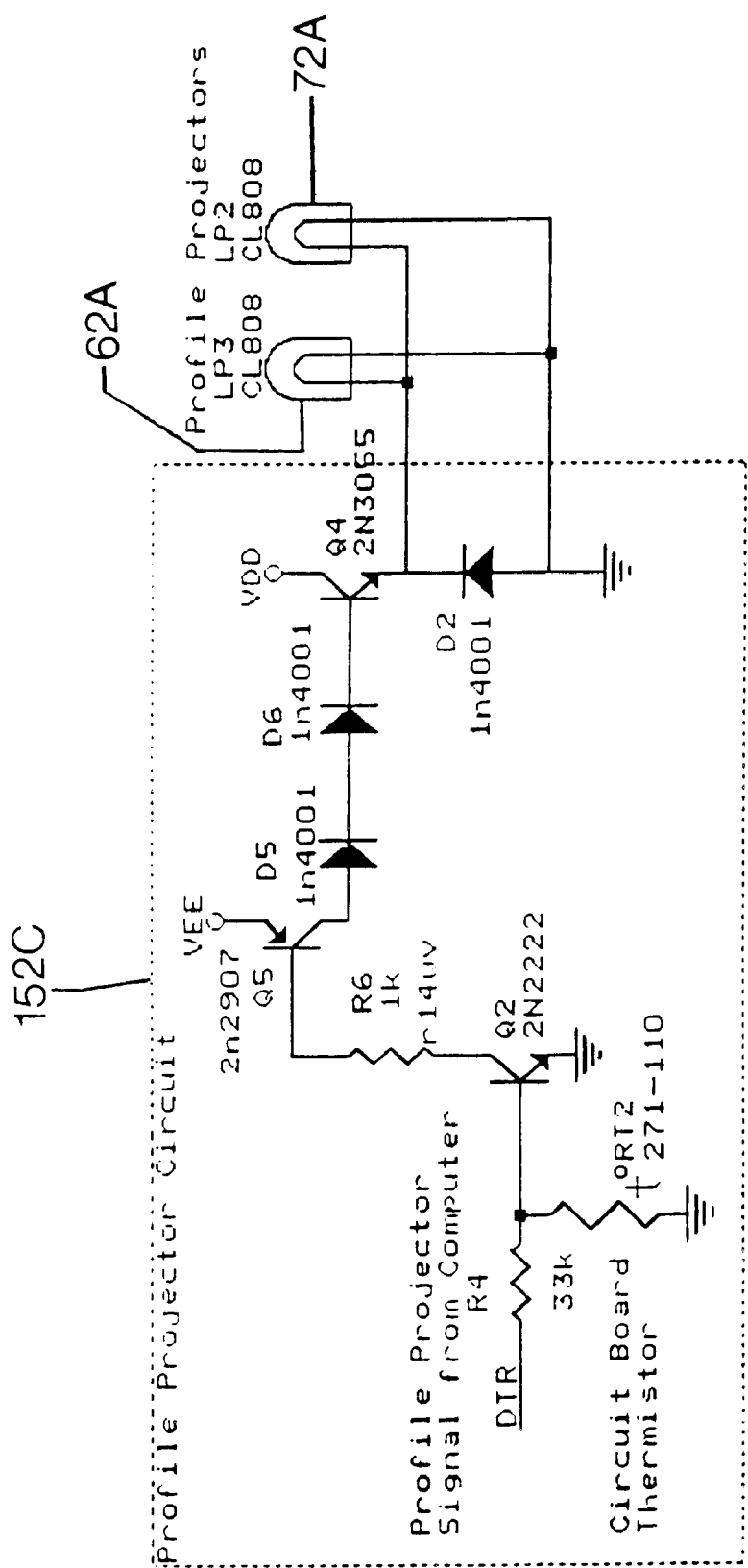
FIG. 8 is an electrical schematic diagram of another portion of the interface driver circuit shown in FIG. 6.

FIGS. 7 and 8 illustrate in further detail the interface driver circuit 152 and transformer circuit 154. The input voltage of the transformer 154 can be 115 VAC 50/60 Hz. The incoming voltage is then stepped down to 12 VAC by transformer 154A, and then run through a bridge rectifier and capacitor circuit 154B1 comprising circuit 154B, providing an unregulated 17 VDC power supply. This voltage is used as the source for the profile projector lamps 62A, 72A as well as both the 5 VDC regulator 154B3 and the 12 VDC regulator 154B2 comprising circuit 154B. The signal power is drawn from the 12 VDC regulator 154B2. The cameras 60, 70 draw their power from a standard 5 VDC regulator 154B3.

The power for the profile projectors 60, 70 is supplied from the unregulated portion of the power supply, but the actual voltage supplied to these lamps is regulated by the 12 VDC supply.

The interface driver circuit 152 (FIG. 6) further includes object projector circuit 152A shown in FIG. 7. Circuit 152A controls the solid state relay 158 to turn the object projector lamp 158 on/off. A logical High level from 1.2 to 30 VDC applied to R1 causes conduction between the emitter and base junction of Q1, causing saturation of the Darlington Transistor Q1. The input signal for this circuit is obtained from the RTS line of the controller's serial port (see FIG. 3, steps 442, 450). A Thermistor RT1 is also mounted in close proximity to the object projector's lamp 84 to prevent the circuit from supplying power if the temperature exceeds 180° F., as a safety measure. Additionally, ventilation slots that the upper rear of the unit prevents heat from building up inside the unit, which could otherwise potentially damage sensitive components.

The interface driver circuit 152 includes circuit 152C (FIG. 8) which drives the profile projector lamps 62A, 72A in response to signals from the controller 150. A logical high level of from 1.2 to 30 volts causes saturation on Q2, which in turn cause saturation on Q5, which in turn supplies current through D5, D6, and Q4's Emitter-Base Junction. Diodes D5 and D6 as well as the voltage drop across Q4 reduces the supplied voltage to the profile projector's lamps 62A, 72A to 9.9 VDC, approximately, which is just under the specifications for the bulbs. A thermistor is mounted in close proximity to Q4, which can generate considerable heat under continuous duty. The circuit is designed such that an excess of 140° F. will shut down the emitter base junction of Q2, thus disabling the circuit. The normal duty cycle of the Profile Projector is well below 10%. The signal to activate this circuit is received from the DTR line of a computer's serial port. See FIG. 17, steps 428, 450.

The interface circuit also includes an AC synchronization circuit 152B (FIG. 7). The secondary of the transformer 154A is fed through resistor R2 causing saturation of Q3 when the signal from the transformer changes to its positive cycle. This signal is then supplied inverted in phase to the CTS line of the controller's serial port. The software then recognizes a High to low transition of CTS and begins the data acquisition phase for a camera. This process is repeated for each image until all cameras have acquired all necessary images, see FIG. 17, steps 442, 432, 446.

The purpose of synchronization circuit 152B is to synchronize with lighting conditions that fluctuate dramatically due to the sinusoidal effect of AC power. This effect is most visible with defective fluorescent lights that tend to half cycle before failing completely, but is not limited to this condition. Most non-incandescent lights have this characteristic, and although incandescent lighting appears to be almost ideal, they too exhibit this characteristic oscillation to a lesser degree. By synchronizing to incoming power, the image subtraction routines are relatively unaffected by distortions of this type.

During the process of real-time imaging, the software makes adjustments to the exposure time with the profile projectors illuminated in order to maximize the contrast in varying lighting conditions. When the adjustments are complete, the computer then turns off the Profile Projectors and continues to monitor the environment. The images are obtained from a PS/2 bidirectional or ECP parallel port interface, and are constantly receiving images during the process of scanning.

Image Collection and Processing

Techniques are described for the correlation of video image objects so as to develop three-dimensional coordinates from the multiple camera perspective machine vision system 50. The final product will be a set of 3-Dimensional Cartesian coordinates, which map the surface of a wide variety of objects. The methods and techniques used for object identification, correlation, image acquisition, edge detection, coordinate interpolation, and other image processing needs may be substituted by other appropriate methods or techniques whether from prior art or adaptations thereof.

Figure 9:
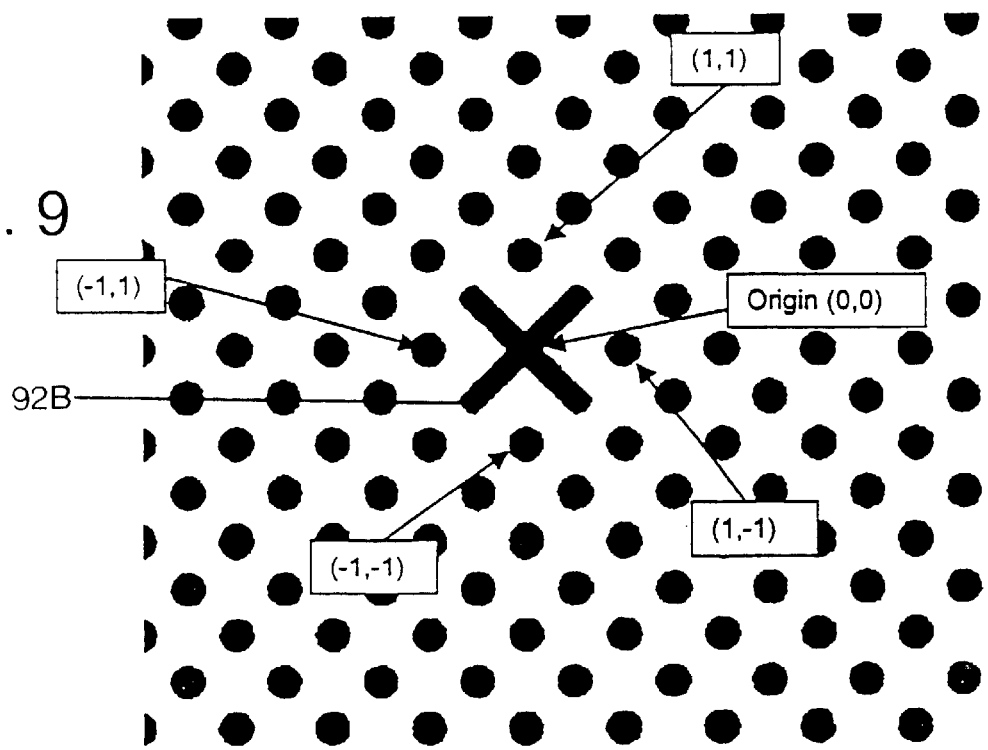
FIGS. 9–11 illustrates exemplary portions of the negative of images captured by the machine vision system.
Figure 10:
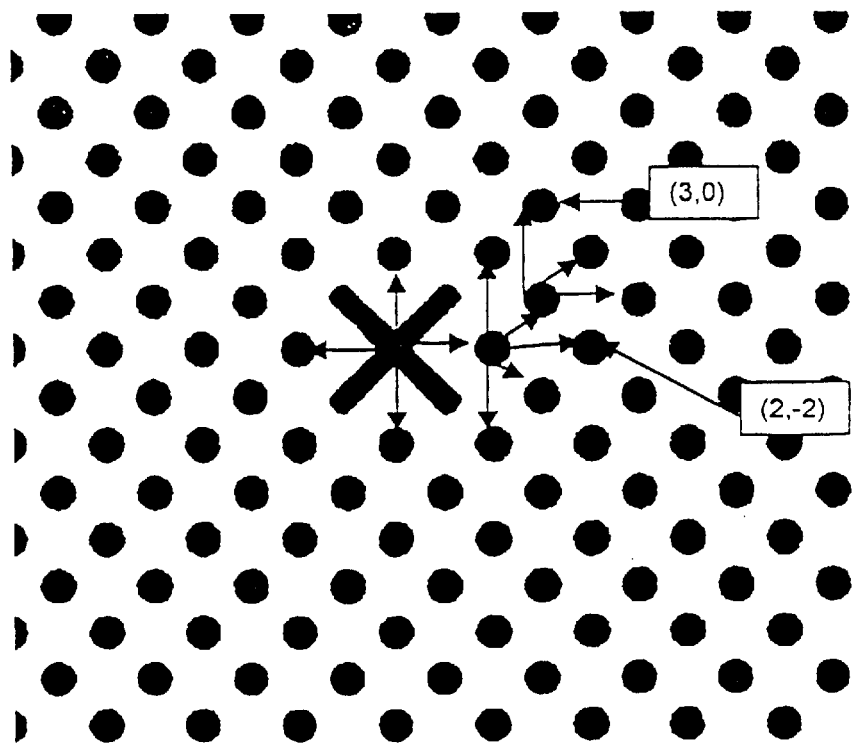
Figure 11:
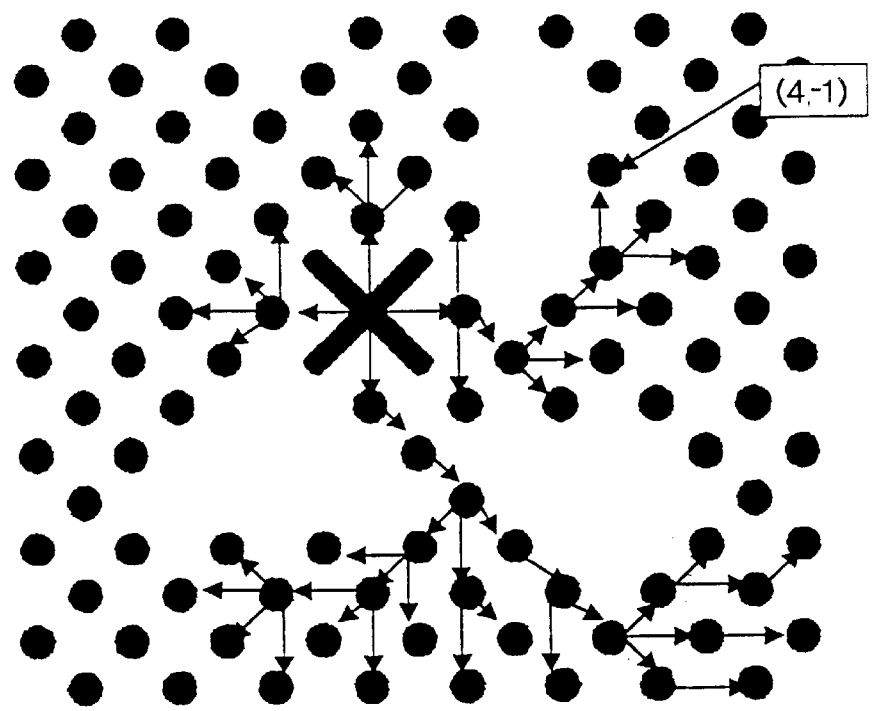

Characteristics of The Object Projector: FIGS. 9–11 are representations of portions of negatives of the light projection and resultant images generated for processing by the exemplary embodiment. The object projector 80 in this exemplary embodiment projects a Matrix Origin Marker 92B in the shape of an "X" as well as a set of uniformly defined matrix of points. These objects are then detected and assigned unique Matrix Coordinates for use with the multiple camera algorithm, which correlates and identifies Mutual Light Objects for each of the several cameras presenting images for processing. One implementation of such a matrix is shown on the Structured Light Mask which is used to project the Light Objects onto the surface of the subject to be scanned, as shown in FIG. 9. The "X" is somewhat thinner in width dimension than the width of the point objects. This is because the X tends to spread out more on the subject than the dots or point objects. It is desirable that the width of the X object as projected on the subject be the same width dimension as the projected diameter of the point objects.

Matrix Coordinates In any Multiple Camera Machine Vision system, the Matrix points are those points, which will be correlated as Common reference points or Mutual Light Objects among the various camera images, and which are common in each camera's or perspective's view. In order to establish their mutual identity, the coordinates are referenced in accordance with an aspect of the invention to a Matrix Origin Marker 92B, which is common to all cameras' views, and assigned a Matrix Coordinate of (0,0), as illustrated in FIG. 9. This coordinate system has a loose relationship with each camera's pixel based coordinate system. For the described exemplary application, the coordinate system for the matrix of points is rotated 45° counter-clockwise from the standard 2 dimensional (2D) coordinate system, but this is not a requirement. Particularly, for this example with an "X" shaped origin marker 92B, the coordinate system is oriented such that the axes of the coordinate system are aligned with the legs of the marker, as illustrated in FIG. 10. The Matrix Coordinates for correlation are assigned such that up and left of origin are (−, +), up and right are (+, +), down and left are (−, −), and down and right are (+, −). All Matrix Coordinate values are integers with no pre-determined Bounds. It is expected that each camera's view does not have a Roll in excess of ±40° with respect to the objects projected onto the surface of the subject in real space being measured.

Sequence of Events At the start of correlation, the following events occur:

Data Acquisition. From each camera's view, three images are captured sequentially for each camera 60, 70. They are identified as the dark reference image, the object projector image, and the profile projector image.

The dark reference image serves as the zero reference for pixel intensity for all object-processing routines, and is an image taken with the subject in place and under ambient light, but with no projector light illuminating the subject to be scanned. The object projector image is taken with the object projector 80 turned on and illuminating the subject, but with the profile projectors 62, 72 turned off. The profile projector image is taken with the object projector turned off and the profile projector(s) for the camera capturing the image turned on and illuminating the subject. In this embodiment, both profile projectors are turned on for each profile image, but this is not required. The profile images for the respective camera or perspective can be taken with only the projector associated with that camera or perspective turned on.

Figure 12:
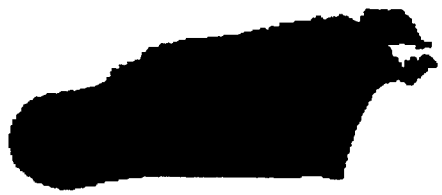
FIG. 12 illustrates an exemplary result of masking an image with the profile of the object being scanned.

The dark image is subtracted from both projector images to increase the contrast between the projected dots on the object projector image and to filter out background lighting for the profile projector image. (See also FIG. 17, steps 436–438 and 452–453) Filterings are done with a view to sharpening and enhancing the images so as to allow for easy and effective Light Object detection. Other methods and techniques known to the art to accomplish these functions can alternatively be employed. Profile Projector Boolean "AND" filter: As illustrated in FIG. 12 the profile of the object being measured is generated and a mask is generated. This mask is applied as a logical AND with the object projector image. All light objects outside this mask are rejected. See FIG. 16, steps 356–362 and 374–380.

Determination of the Acceptable Object Pixel Population: A High Pass Intensity Filter as well as an object Band Pass Object Pixel Population Filter is applied to the subtracted profile projector image. All objects are then identified and their pixel populations are noted for each located object. From this data, the median object pixel population is then calculated. See FIG. 16, steps 378, 388 and 392.

Identification of the Origin Marker: The Matrix Origin Marker is initially identified among the other objects as the largest and brightest object in the object projector image with a population within a defined range based on the median object pixel population. The Matrix Origin Marker does not necessarily have to be an X shape. See FIG. 16, step 394.

Identification of the 4 Nearest Objects to the Origin Marker: These objects are identified as the nearest 4 objects whose pixel population closely matches the median pixel population of all objects collected during data acquisition. Dependent on the quality of the images, tolerances are allowed for to accept or reject these unassigned objects. See FIG. 16, steps 396–398.

Determination of the Initial Unit Distance: The distance from the centroid of the Matrix Origin Marker to each of these neighboring objects is measured, throwing out the farthest and nearest objects, and averaging the remaining 2 object distances. This value is then divided by the square root of 2 in this exemplary embodiment, and defined as the initial Unit Distance. See FIG. 16, step 396.

Calculation of the Origin Marker Roll Angle: The neighboring object's angles are measured as their Roll from the Matrix Origin Marker, and averaged to determine the angle of the object projector with respect to each camera's view. This term is defined as the grid angle. The function used to determine the angles is commonly referred to as Arctan2. See FIG. 16, step 398.

Assignment of Matrix Coordinates: Throughout the process of correlation, objects acquired through data acquisition are assigned Matrix Coordinates after having been identified by their expected distance and angle from previously assigned matrix objects. Each time an object is assigned its relative position on the matrix, its distances to its neighboring assigned Matrix objects are again averaged, and recorded as the local Unit Distance. This local unit distance is then used to find neighboring objects to the assigned Matrix object being processed. (see FIG. 10) In this way, sharp contours affecting the placement of the projected objects on the object being measured are anticipated. This process terminates when there are no further objects to assign Matrix Coordinates. See FIG. 16, step 400.

Flexibility of the Object Projector to the Camera's Orientation: Although the system 50 maintains relatively tight tolerances, in this exemplary embodiment, each camera's roll angle can operate with a ±40° rotation from its expected position and still produce repeatable Matrix Coordinates and function with a high degree of accuracy. Additionally, lens distortions in the camera and/or in the projector have little effect on the process of correlation, due to the fact that unit distance is anticipated.

Characteristics of the Object Projector: The object projector 80 projects light through a Structured Light mask onto the surface of an object. The mask can be a simple film based slide projector mask, an etched-on-glass mask, or a mask fabricated in other ways, but the contrast between light and dark areas of the mask is preferably maximized. On a flat surface perpendicular to the object projector, all projected objects are uniformly spaced. (See FIG. 5) Although it is acceptable for this algorithm that barrel distortion or pincushion distortion exist in the object projection system, it is preferably avoided in order to provide uniform spacing on the resulting 3D coordinates.

Adaptability of Correlation: During sharp contour changes, the projected objects' distances from each other will tend to change, sometimes by being closer together and sometimes by being farther apart. This change in distance is then accounted for in a manner which is local to each assigned matrix object, without interfering with the process of correlation in areas away from the change. (See FIG. 10) Tolerances of Expected Angle and Expected Distance from each of the neighboring object's Centroid locations are assigned, which allow for minor changes in distance from one assigned Matrix Object to the next. Each assigned object has a unique identity and characteristic of distance and angle with respect to its neighboring assigned objects, which are stored in their respective databases. Additionally, there does not have to be a direct path from the Origin Marker to an identified object to assign Matrix Coordinates, as shown in FIG. 11, which shows an example of matrix paths with significant loss of object data.

Estimating Pseudo 3-D Points: In accordance with an aspect of the invention, an algorithm for estimating pseudo 3-D points is designed to work with the multiple camera machine vision system 50. Its purpose is to interpret the profile of the object being measured. The profile projectors 62, 72 are used for this algorithm. The profile projectors 62, 72 are preferably in close proximity to the cameras 60, 70, and in this example are on their outside edges. The profile projectors should evenly project light across the surface of the object being measured; the exemplary embodiment employs elliptical reflectors for the lamp.

Deriving a Profile Definition of the Scanned Object: Image processing of the profile projector image will yield a Profile Definition. The following steps are used to acquire the Profile Definition of an object. The Dark reference image is subtracted from the profile projector image, in order to eliminate background lighting. See FIG. 17, step 426.

Figure 16:
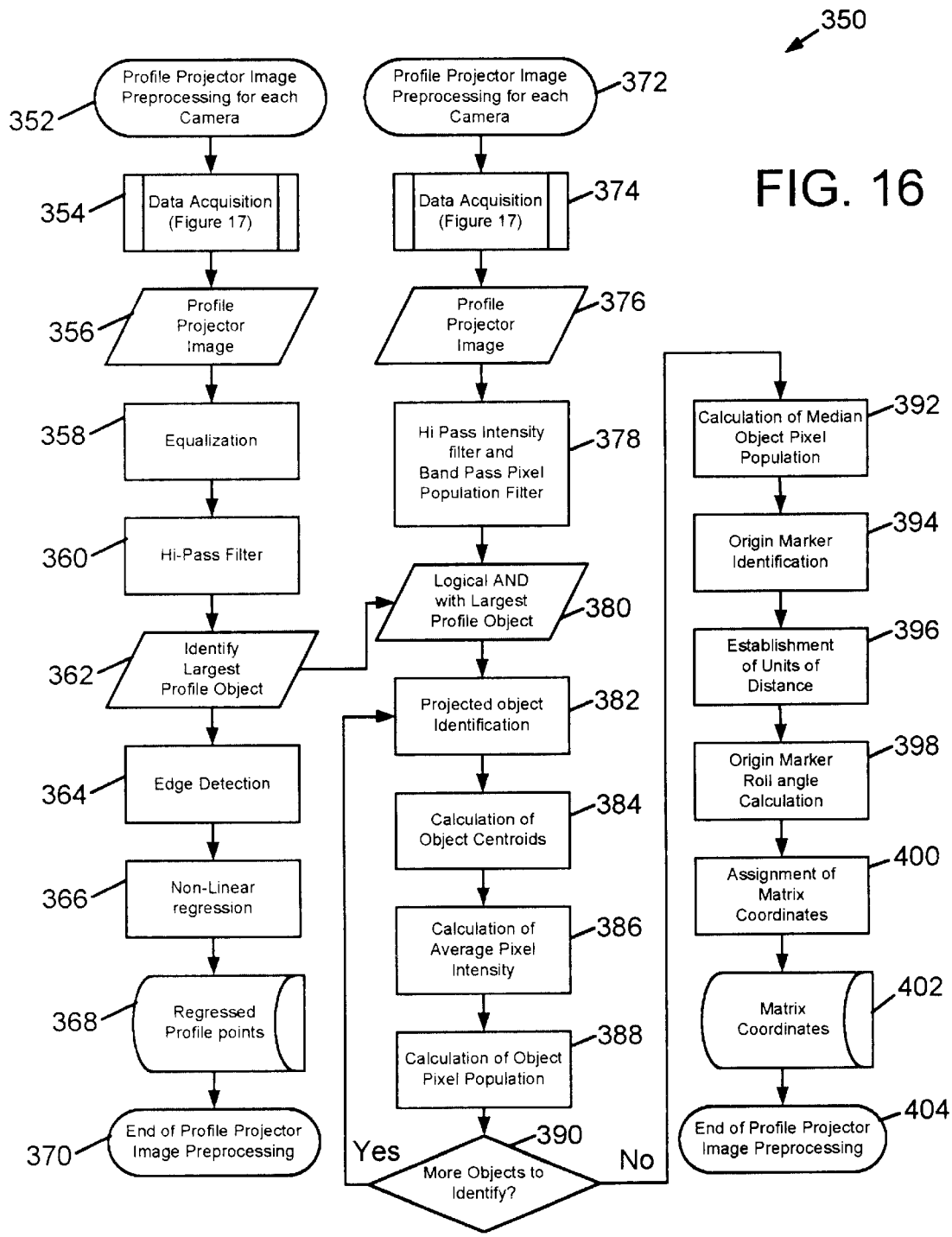

The image is then equalized, as shown in FIG. 16, step 358. The purpose of this equalization process is to standardize the High Pass Intensity Filter value required to separate the item being measured from the background objects. A High Pass Intensity Filter is then applied to the image, with the results illustrated in FIG. 12, and as described FIG. 16, step 360, reducing the image to objects illuminated by the profile projectors. The largest object is then identified, and a Laplacian operator is applied to it, reducing it to the edge of the object. Optionally, LoG (Laplacian of Gaussian), Prewitt, Sobel, and Roberts Cross operators, among others, could also be used in place of the Laplacian operator, each with specific advantages and disadvantages for a given application.

Figure 13:
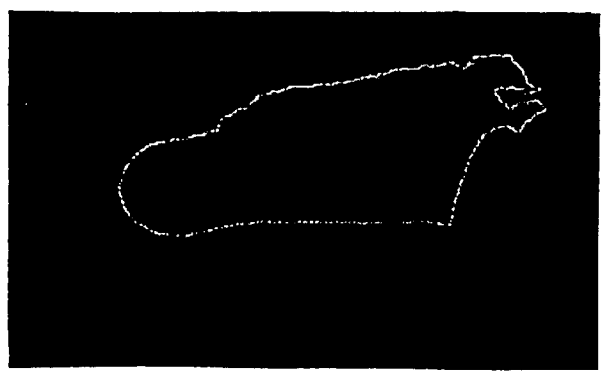
FIG. 13 illustrates an exemplary result of reduction of the edge of the image to single pixel widths.

A non-linear regression routine is then applied to the remaining data in segments, reducing the edge to single pixel widths, with the results illustrated in FIG. 13. See FIG. 16, step 366. In this exemplary application, a Least Squares approach is employed for this purpose, but any number of routines that provide edge thinning with noise reduction could alternatively be employed. The final result of the image processing is the Profile Definition.

Figure 14:
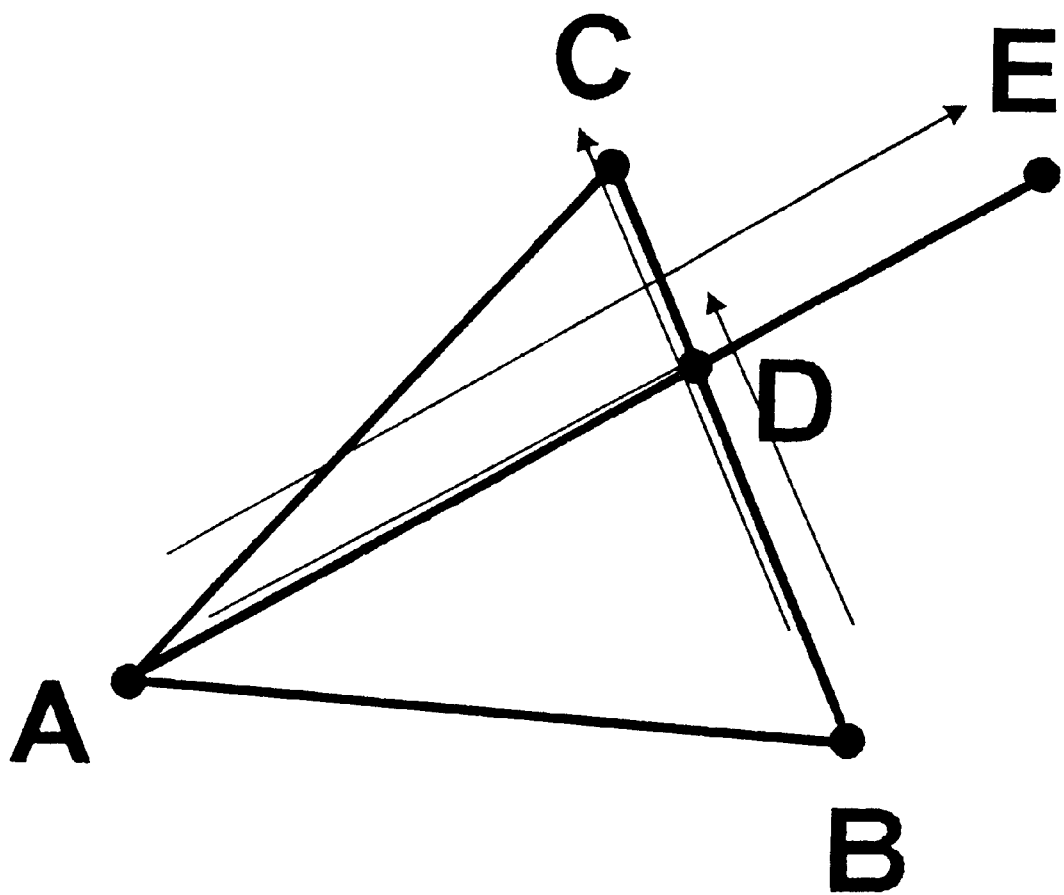
FIG. 14 illustrates a technique for calculation of a pseudo 3-D coordinate on the surface of a contour.

Referring now to FIG. 14, the calculation of pseudo-3D coordinates is illustrated with an example. Points A, B, and C are correlated objects obtained from 2 or more camera views. These points have 2D pixel coordinates and 3D Cartesian coordinates, as obtained from the multiple camera machine vision system 50. Point D is the theoretical 2D pixel-based intersection between line AE and BC. Point E is an uncorrelated point, to be solved for its pseudo-3D coordinates, and is known only in the 2D pixel-based image. In this example, E is a selected point along the profile of the object being measured, but it can be any uniquely identifiable point on the contour to be measured in proximity (in 2D) to points A, B and C. Typically the selection is done in a sequential fashion along the profile object. It is defined as a coordinate in pixel space.

2D Identities $M_1$ is defined as the slope of the line AE.

$b_1$ is defined as the y-intercept of the line AE.

$M_2$ is defined as the slope of the line BC.

$b_2$ is defined as the y-intercept of line BC.

$A_2$, $B_2$, $C_2$, $D_2$, and $E_2$ are 2D pixel coordinates containing an X, Y element.

V1 is defined as the vector $B_2C_2$.

V2 is defined as the vector $B_2D_2$.

V3 is defined as the vector $A_2D_2$.

V4 is defined as the vector $A_2E_2$.

3D Identities $A_3$, $B_3$, $C_3$, $D_3$, and $E_3$ are 3D Cartesian coordinates containing X, Y, and Z element.

V5 is defined as the vector $B_3C_3$.

V6 is defined as the vector $B_3D_3$.

V8 is defined as the vector $A_3E_3$, whose endpoint defines the solution, $E_3$.

Solving the Unknown Identity $D_2$ is obtained by determining the intersection between line $A_2E_2$ and line $B_2C_2$.

$L_1$ is the length of vector V1.

$L_2$ is the length of vector V2.

Vector V5 is scaled by $L_2/L_1$ and stored as V6. The endpoint of V6 is then defined as $D_3$.

$D_3$ is now assumed to be on the plane formed by $A_3B_3C_3$.

V7 is defined as the vector $A_3D_3$.

$L_3$ is the length of vector V3.

$L_4$ is the length of vector V4.

V7 is scaled by $L_4/L_3$ and stored as V8. The endpoint of V8 is the result, $E_3$.

Alternate solutions to this linear calculation of a pseudo 3-D coordinate on the surface of a contour can be employed, and for example can be derived using a spherical method, or using a 3 dimensional Least Squares non-linear regression method, assuming there are sufficient 3D points in the area for either method to function.

Figure 15:
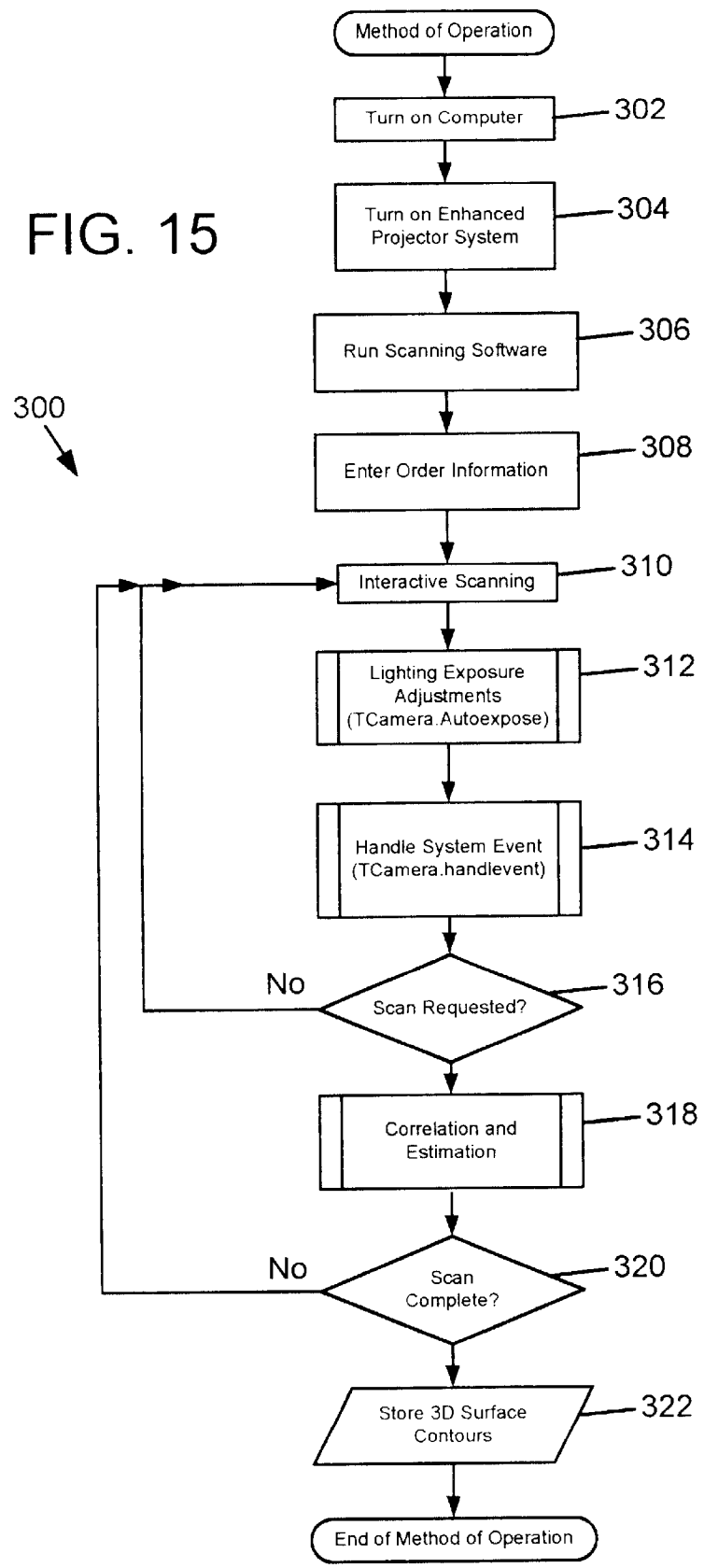
FIGS. 15–19 illustrate flow diagrams of an exemplary method for scanning a subject in accordance with aspects of the invention.

FIG. 15 illustrates a flow diagram of an exemplary method of operation for the machine vision system 50. The method 300 commences at 302 with powering up the computer which serves as the controller for the technique. The projector system 80 is then turned on (304), and the scanning software program for performing the scanning is initiated (306). At 308, order information for the scan to be performed is entered by the operator. This can include, in the example of a foot scanning process, patient information. Operation then proceeds to the interactive scanning menu at 310, which facilitates operator control of the events leading up to the scan sequence.

Lighting adjustments are made at 312, and various system events are managed at 314, including for this exemplary embodiment, the user operation of selecting left/right foot, positioning of the foot subject in the scanner field of view, and operation of the computer keyboard or scanner activation switch. Once a scan has been requested (316), operation proceeds to process 318, correlation and estimation, described in FIGS. 18A–18B. Operation loops through steps 310–318 until the scan is completed (320). The 3D surface contour data is then stored for further use at 322 in system memory, and the operation has been completed.

FIG. 16 illustrates preprocessing steps performed on data to preprocess light object data and determine matrix definitions, done for each camera 60, 70. Steps 352–370 illustrate the profile projector image preprocessing done for each camera. Steps 372–404 illustrate the object projector image processing done for each camera.

Figure 17:
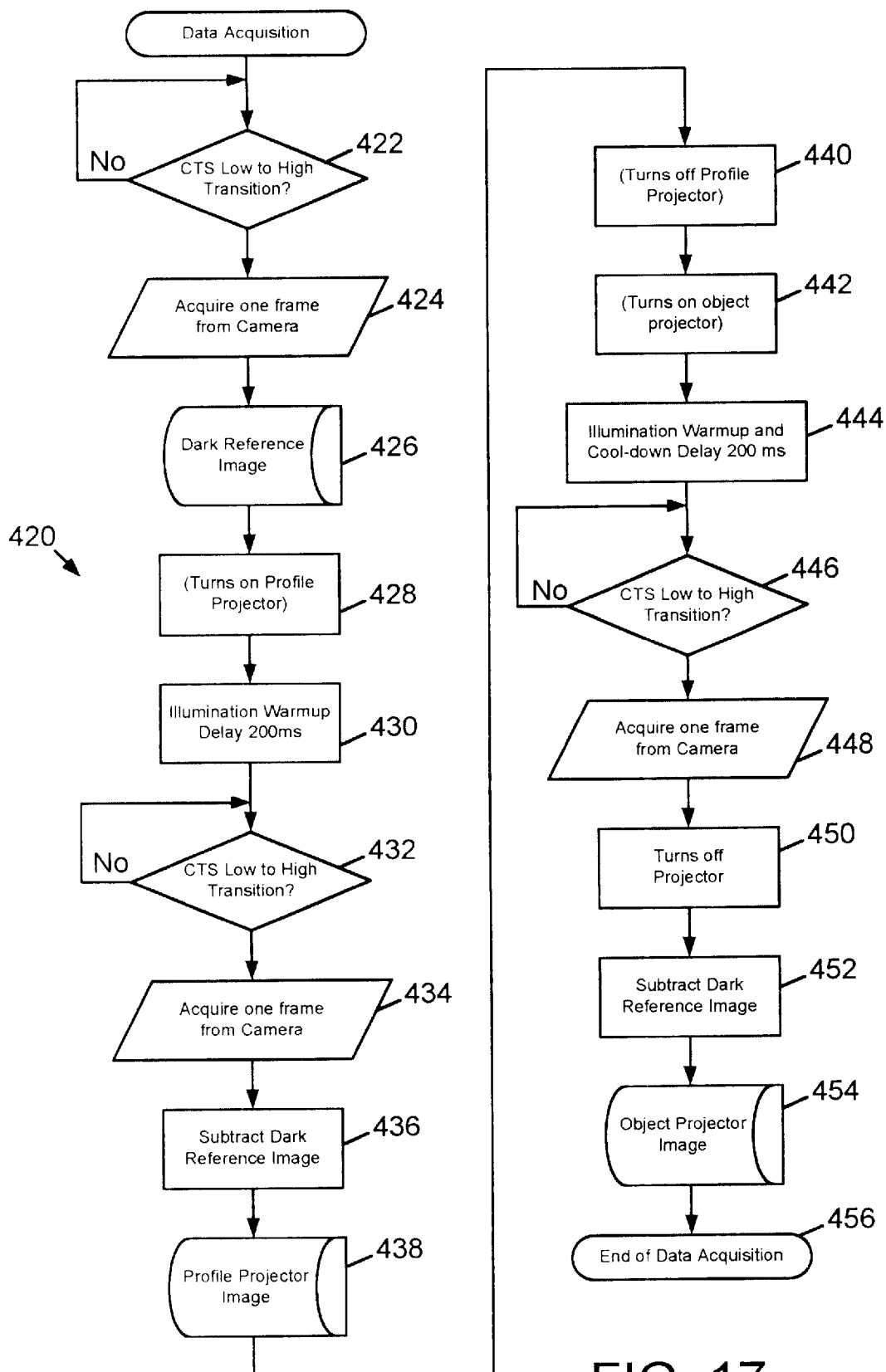

The profile projector image preprocessing 352 commences with data acquisition of the image, described more fully with respect to FIG. 17, and the profile projector image is obtained at 356 for the camera. After equalization (358) and high-pass filtering (360) processes performed on the image, the largest profile object is identified at 362. The image is then subjected to edge detection (364) and non-linear regression (366) processes, to obtain the regressed profile points (368) for the image. The preprocessing 352 is repeated for the second camera.

The object projector image preprocessing 372 commences with data acquisition (FIG. 17) of the image using the object projector 80, to obtain for the camera an object projector image (376). This image is subjected to high pass intensity filtering and band pass pixel population filtering at 378. The filtered image is then subjected at 380 to a logical AND process with the largest profile object (from step 362), by requiring that any object for consideration as a true light object for future operation as such must be located within a specified distance of the Largest Profile object. For each object in the image, its centroid, average intensity and object pixel population are calculated (382–390). At 392, the median object pixel population is calculated. At 394, the origin marker is identified. The units of distance are established at 396. At 398, the origin marker roll angle is calculated. At 400, assignment of matrix coordinates occurs, to provide the matrix coordinates (400) which are stored for subsequent use. Steps 372–402 are then repeated for the second camera using the object projector.

A typical data acquisition process 420 is illustrated in FIG. 17. Once a CTS low to high transition occurs (422), one image frame is acquired from the camera, and is stored as the dark reference image (426), i.e. the image frame is acquired with ambient light conditions. The profile projector associated with the camera is turned on (428), and operation waits for a warm up time (430). Once a CTS low to high transition occurs (432), one image is acquired from the camera at 434. The dark image is subtracted from the acquired image at 436 to provide a profile projector image, stored at 438. The profile projector is turned off (440), and the object projector 80 is turned on (440). After an illumination warm-up and cool-down delay to permit the object projector lamp to warm-up and the profile projector lamp to cool down (444), and after a CTS low to high transition (446), one image is acquired from the camera at 448. The object projector is turned off (450). The dark reference image is subtracted from the image at 452, and the object image is obtained and stored (454). The process 420 is repeated for each camera.

Figure 18A:
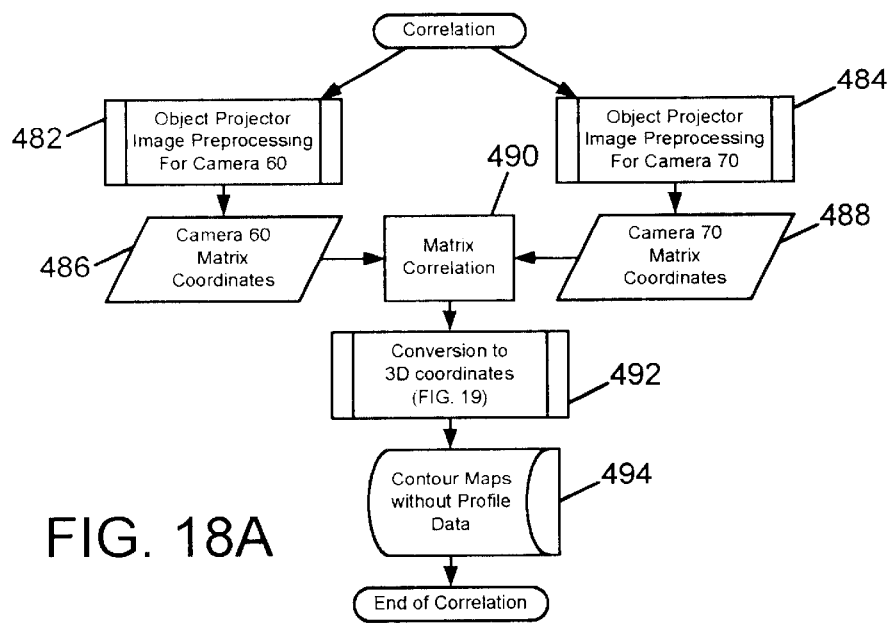
Figure 18B:
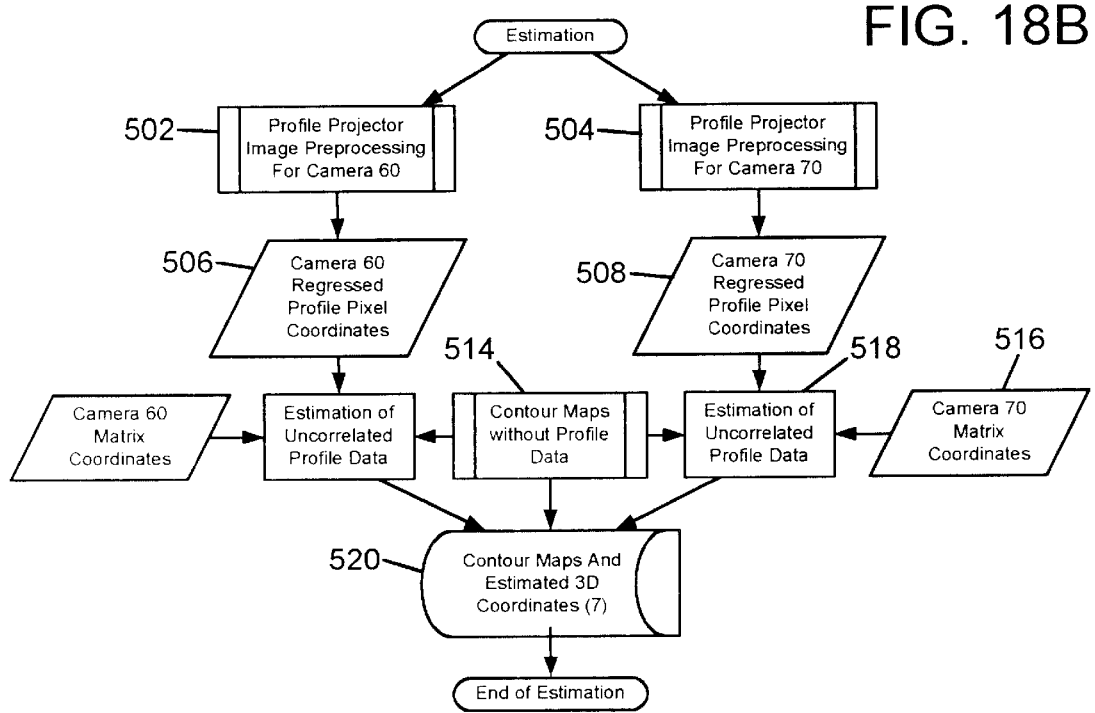

FIGS. 18A–18B illustrate exemplary techniques for performing the correlation and estimation function 318 (FIG. 15). FIG. 18A illustrates a correlation technique 480. The correlation is performed on the results of the preprocessing and matrix definition operation 372 illustrated in FIG. 16 for the object projector images. Thus, 482, 484 illustrates these operations to provide the matrix coordinates for cameras 60, 70 (486, 488). A matrix correlation process is performed at 490 (where each corresponding light object for each camera/perspective is cross-correlated to each other), and a conversion to 3D coordinates is performed at 492. (The conversion to 3D coordinates is described more fully with respect to FIG. 19) This provides a contour map without profile data (494).

FIG. 18B illustrates an estimation technique 500 which can be employed to obtain contour maps with pseudo or estimated coordinate data. The estimation is performed with the results of the profile projector image preprocessing performed for each camera (502, 504), i.e. the regressed profile coordinates shown as 506, 508. At step 512, an estimation is performed of the uncorrelated profile data, using the camera 60 matrix coordinates (from 402, FIG. 16), the regressed profile pixel coordinates (510) and the contour map without profile data (514) from FIG. 18A. Similarly for camera 70, an estimation is performed of the uncorrelated profile data, using the camera 70 matrix coordinates (from 402, FIG. 16), the regressed profile pixel coordinates (516) and the contour map without profile data (514) from FIG. 18A. These estimation operations provide at 520 contour maps and estimated 3D coordinates for the subject 3D object, e.g. a patient's foot.

Figure 19:
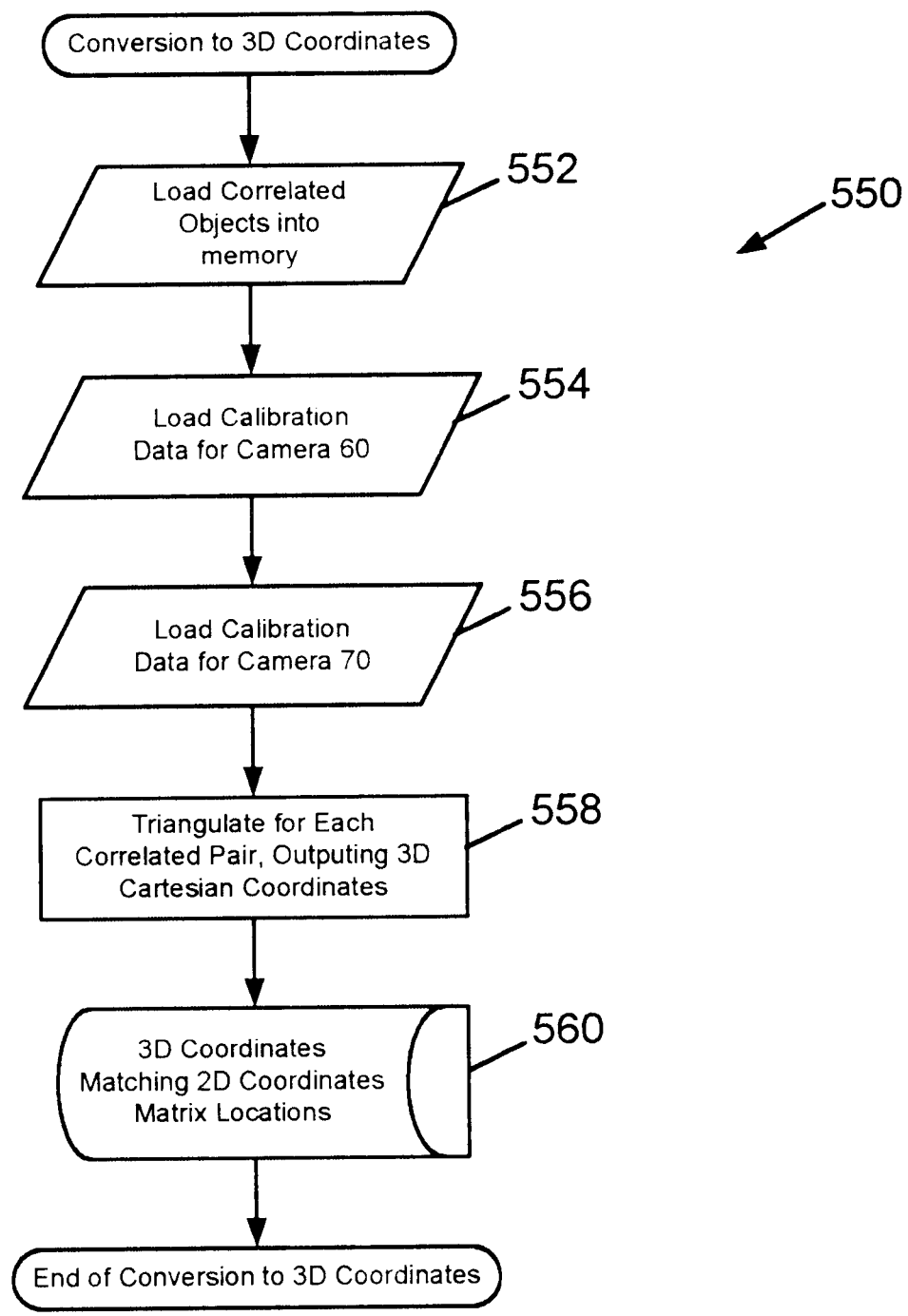

FIG. 19 illustrates an exemplary technique 550 for converting the data into 3D coordinates. At step 552, the matrix correlated objects are loaded into memory (see step 490, FIG. 18A). At steps 554, 556, calibration data for the cameras 60, 70 is loaded, i.e. retrieved from memory. This calibration data defines the exact physical characteristics of the particular scanner unit, including the angle of the cameras relative to each other, and their distance from each other. The calibration data is typically measured when the unit is manufactured, and stored for operational use. At 558, each correlated pair of objects is triangulated, outputting 3D Cartesian coordinates for each correlated object pair (560).

Glossary

Arctan 2: An extension of the arctangent function that returns a value that represents the angle between any 2 points in 2 dimensional space:

```
function arctan2 (y,x:double):double;
begin
  if x = 0 then begin
    if y < 0 then arctan2 : = -pi/2 else
    if y > 0 then arctan2 : = -pi/2
    else arctan2 := 0
  end
  else if x > 0 then arctan2 : = arctangent (y/x)
  else arctan2 : = pi + arctangent (y/x);
end:
```

Band Pass Object Pixel Population Filter: An operation that rejects any detected object whose population measured by the number of pixels that it occupies is above or below a specified amount.

Centroid: This is the average of all of the coordinates that make up a projected object in pixel space.

Contour Map: An array of points in 3-dimensional space that represents the surface of an object.

Correlation: The act of identifying mutual points in 2 or more images from 2 or more cameras.

CTS: An input signal from a serial port, which is commonly referred to as Clear to Send.

DSR: An input signal from a serial port, commonly referred to as Data Set Ready.

DTR: An output signal from a serial port, which is commonly referred to as Data Terminal Ready.

Equalized: The process of stretching the histogram of intensity in an image such that the lowest pixel intensity becomes 0 and the highest becomes the maximum allowed for a range defined in bits per pixel. With 6 bits, this maximum is 63.

High Pass Intensity Filter: An operation that zeros pixel intensity values in an image if it falls below the cutoff threshold.

Least Squares Linear Regression: A method of defining a line based on input data in 2 dimensions (x,y) that returns a value for slope (m) and a y-intercept.

Mask: A device that blocks light from passing through it in some areas, while allowing light to pass through it in others.

Matrix Origin Marker: The point at which something comes into existence or from which it derives or is derived. The Matrix Origin Marker represents the starting point of the matrix which is later used for correlation.

Mutual Light Objects: Detected light objects that have Matrix Coordinates that match in other cameras' views.

Multiple Camera Machine Vision: The use of two or more cameras acquiring images for three-dimensional recognition of objects.

Nonlinear Regression: A method of determining the coefficients of an nth order polynomial equation with the number of equations being equal to the number of unknowns.

An exemplary application for the machine vision techniques described above is to develop a set of three-dimensional coordinates is used for establishing the surface geometry for use in the fabrication of foot orthosis or arch supports. Other applications include using the set of three-dimensional coordinates to establish the surface geometry for use in biomechanically related or motion study related programs, or in general purpose CAD/CAM programs, mold-making CAD/CAM programs or drafting programs.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A method for optically scanning a subject having a three-dimensional surface contour, comprising:

illuminating the subject with a matrix of discrete two-dimensional image objects;

capturing respective object illumination images of the illuminated subject from different known image perspectives;

capturing respective two-dimensional projector profile images of the subject at each image perspective and with the subject illuminated with light from an illumination source directed at the subject from a perspective different from the perspective of the object illumination light;

processing the projector profile images to develop an edge detection image of the subject;

processing the respective object illumination images to obtain a set of three-dimensional coordinates of at least a portion of the surface contour, said processing including correlating positions of common discrete image objects in the respective illumination images, using data regarding the image perspectives; and analyzing the profile images and the set of three-dimensional coordinates to derive pseudo three-dimensional data in areas of the scanned subject which are near to edge-detected areas of the respective profile images.

2. The method of claim 1 wherein said step of capturing respective object illumination images includes:

capturing said illumination images with respective cameras located at said different image perspectives relative to the subject being scanned.

3. The method of claim 1, wherein said step of processing the respective object illumination images includes:

calculating a coordinate position representing the location of the respective image objects in the captured illumination images.

4. The method of claim 3, wherein said step of calculating a coordinate position includes:

calculating centroid positions for the respective image objects in the respective illumination images.

5. The method of claim 1, further including:

capturing respective ambient light images of the subject at the respective image perspectives under ambient light conditions; and subtracting the respective ambient light images from the respective object illumination images to provide compensated object illumination images, said compensated object illumination images used in said processing step.

6. The method of claim 1 wherein the matrix of objects includes a pattern of dots.

7. The method of claim 1 wherein the matrix of objects includes a unique matrix origin marker object and a uniform matrix of objects.

8. The method of claim 1, wherein said analyzing step includes:

deriving said pseudo three-dimensional data as linear extrapolations of nearby common discrete objects having three-dimensional coordinates associated therewith.

9. The method of claim 1 wherein the subject is a human foot.

10. The method of claim 1 wherein the subject is a part of animal or human anatomy.

11. A method for optically scanning a subject having a three-dimensional surface, comprising:

disposing the subject at a location within the field of view of at least first and second cameras located to provide respective camera perspectives which are different for each camera;

illuminating the subject with object projector light which illuminates the subject with a matrix of discrete two-dimensional image objects;

capturing respective object illumination images of the subject with each camera;

correlating the respective images to generate a set of common surface reference points between the respective camera perspectives;

analyzing the respective images using the common surface reference points to produce a set of three-dimensional coordinates for at least a portion of the surface of the subject; and analyzing the profile images and the set of three-dimensional coordinates to derive pseudo three-dimensional data in areas of the scanned subject which are near to edge-detected areas of the respective profile images.

12. The method of claim 11 further comprising:

capturing respective ambient light images of the subject with each camera under ambient light conditions; and subtracting the respective ambient light images from the respective object illumination images.

13. The method of claim 11 wherein the matrix of discrete image objects includes a pattern of discrete dots.

14. The method of claim 11 wherein the matrix of image objects includes a uniquely-shaped matrix origin marker image object positioned within a uniform matrix of discrete image objects.

15. The method of claim 14 wherein the matrix origin marker image object is in the form of an "X".

16. The method of claim 15 further comprising:

capturing respective two-dimensional projector profile images of the subject with each camera and with the subject illuminated with light from an illumination source directed at the subject from a substantially similar perspective as its associated camera;

processing the projector profile images to develop edge detection images of the subject.

17. The method of claim 11, wherein said analyzing step includes:

deriving said pseudo three-dimensional data as linear extrapolations of nearby common discrete objects having three-dimensional coordinates associated therewith.

18. The method of claim 11 wherein the subject is a human foot.

19. The method of claim 11 wherein the subject is a part of animal or human anatomy.

20. A machine vision system including camera apparatus disposed at different camera perspectives relative to a subject, the system including one or more light projectors for projecting a grid-like structured light projection onto the subject, the machine vision system capturing a sequence of images including a light object projector image and an ambient light reference image from each camera perspective, and a processor for determining and correlating the image light objects to generate a set of common surface reference points between camera perspectives, and then triangulating upon the reference points to produce a three-dimensional set of coordinates for at least a portion of the surface of the subject.

21. The machine vision system of claim 20, further including one or more profile projectors which illuminate areas not adequately illuminated by the one or more light object projectors, to present to the camera perspectives image information not present in the respective light object images.

22. The method of claim 21, wherein the set of three-dimensional coordinates is used for establishing the surface geometry for use in general purpose CAD/CAM programs, mold-making CAD/CAM programs or drafting programs.

23. The machine vision system of claim 20, wherein the processor is adapted to process profile images captured by the respective cameras with the subject illuminated by the one or more profile projectors, and to develop a profile image of the subject being scanned, detect edges of the subject, and interpolate between the three-dimensional coordinates and the two-dimensional data of the profile images, so as to derive pseudo three-dimensional data in the area of the scanned subject which is near to the edge detected areas of the profile image.

24. The machine vision system of claim 20, wherein the subject is a part of human or animal anatomy.

25. A method for scanning a three-dimensional surface contour to provide a set of three-dimensional coordinates of at least a part of the surface contour, comprising:

providing a light object projector to project a grid-like structured light pattern of discrete image objects onto the surface;

employing a machine vision system with stereo camera perspectives relative to the surface to capture a sequence of images of the surface including a light object projector image and ambient light reference image from each camera perspective;

providing digitized versions of the sequence of images to a processor;

correlating with the resulting image light objects to generate a set of common surface reference points between camera perspectives;

triangulating upon the common reference points to produce the three-dimensional set of coordinates for the surface.

26. The method of claim 25, further comprising:

providing one or more profile projectors which illuminate areas not adequately illuminated by the light object projector;

presenting to the camera perspectives image information which allows the development of one or more two-dimensional profile images of the subject being scanned;

processing the one or more profile images to obtain profile edge data of the subject;

interpolating between the set of three-dimensional coordinate data and the two-dimensional data of the one or more profile images to derive pseudo three-dimensional data in the area of the scanned subject which is near to the edge detected areas of the profile image.

27. The method of claim 26, wherein said interpolating step includes:

deriving said pseudo three-dimensional data as linear interpolations of the three-dimensional coordinates of nearby common discrete objects having three-dimensional coordinates associated therewith.

28. The method of claim 26, wherein the set of three-dimensional coordinates is used for establishing the surface geometry for use in the fabrication of foot orthosis or arch supports.

29. The method of claim 26, wherein the set of three-dimensional coordinates is used for establishing the surface geometry for use in biomechanically related or motion study related programs.

* * * * *